June 12, 1951
J. GRAATEN
2,556,533
ARTIFICIAL BAIT FOR FISHING
Filed Nov. 5, 1946
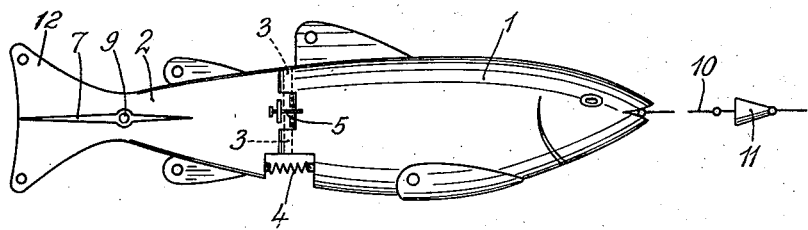
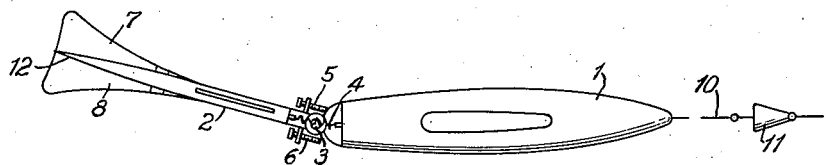
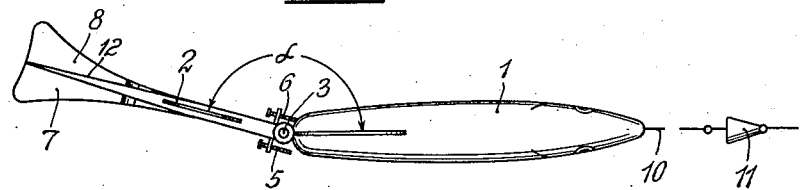
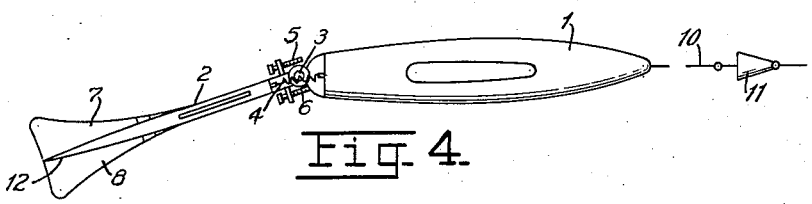
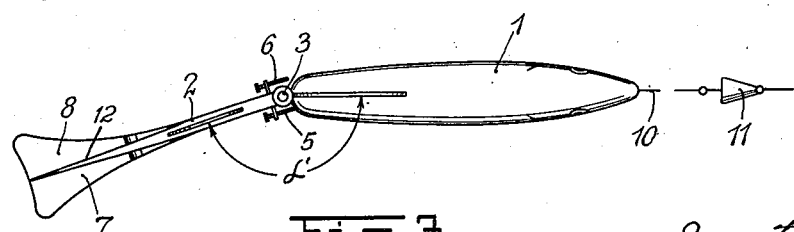
Inventor:
Johannes Graaten,
By: Pierce, Scheffler & Parker
attorneys.

Patented June 12, 1951

2,556,533

UNITED STATES PATENT OFFICE 2,556,533

ARTIFICIAL BAIT FOR FISHING

Johannes Graaten, Sjusjoen on Lillehammer, Norway

Application November 5, 1946, Serial No. 707,799
In Norway May 16, 1945

4 Claims. (Cl. 43—42.15)

The present invention relates to artificial baits of that type which imitates a little fish and which furthermore has the ability to perform a zigzag movement when being pulled through the water. It is thus generally an artificial bait of the type called a wag-tail.

The object of this invention is to construct an artificial bait in such a way, that it will perform a zigzag movement to a great extent and thereby imitate the movements of a real fish which is in great distress and is trying to get away from some kind of danger. With this object in mind the artificial bait according to this invention is built up in a previously known manner of two or more sectional parts hinged together with their axis of swing normal to the longitudinal axis of the bait.

A special feature in connection with the artificial bait according to this invention is the arrangement of a snap mechanism in a joint between two parts of the body of the bait, which snap mechanism will tend to hold the two parts in angular relation with respect to each other. The snap mechanism is therefore constructed in such a way that the two parts will be unstable when in line with each other and will have to swing one way or the other when in line with each other.

The snap mechanism according to this invention may easily be constructed by arranging a spring member between the two jointed parts at or over the axis of the hinge between the two parts or it may be constructed in other conventional ways.

The invention also comprises the arrangement of the weighted string for the pulling of the bait through the water. Just a little distance in front of the head of the bait there is arranged on the line a small weight which increases the mass of the string and tends to prevent the string from moving with the bait to the side, thereby cooperating with the snap mechanism to shift the tail part of the bait from one side to the other.

The invention comprises further the arrangement of an elevation rudder on the tail part of the bait. This elevation rudder is pivotally attached to the tail part and may be set by hand to adjust the elevation of the bait in the water when being used.

In order that this invention may be easily understood, and worked, it will in the following be described with reference to the drawing, showing a preferred embodiment of the invention and in connection with this description other features of importance will be evident.

In the drawing Fig. 1 illustrates an artificial bait according to the invention seen from the side.

Fig. 2 illustrates the bait seen from above with the tail part swung out to one side with an angle $a$ between the two parts.

Fig. 3 illustrates another view seen from above with the tail part swung out to the other side with an angle $a'$ between the two parts.

Fig. 4 is a bottom plan view of the bait with the parts as shown in Fig. 2 and

Fig. 5 is a similar view with the parts as shown in Fig. 3.

In the drawing is illustrated an artificial bait in the shape of an imitation fish. It consists generally of two parts, a front part 1, which includes the head part, and a rear part 2, which includes the tail part. These two parts are connected together by means of a suitable pivot member 3 which forms an axle in such a way, that the front part 1 and the rear part 2 may swing in relation to each other whereby the artificial fish is adapted to wag the tail. Between the parts 1 and 2 there is arranged a resilient member, such as a spring 4 attached to the parts 1 and 2 respectively in front of and in the back of the pivot 3 in such a way, that a snap mechanism of well-known character is constituted. This snap mechanism may of course be constructed in any conventional way and will have the action of swinging the tail part 2 out to one side of the longitudinal axis in relation to the front part 1 any time the two parts are in line with each other.

On the rear part 2 there are arranged adjusting means 5 and 6 which may be in the shape of set screws and which are adapted to form abutments between the two parts and thereby determine the maximum angle $a$ and $a'$, which the tail part may swing out to the side with reference to the front part of the bait.

On the tail 2 there is further arranged an elevation rudder 7, 8. On each side this rudder is adjustably attached to the tail by means of a rivet 9 and may be set by hand to determine the depth to which the artificial bait shall swim when pulled through the water. At the front end a string 10 is attached to the mouth of the artificial bait and this string is provided with a weight or load 11, giving the string an additional mass of inertia which will tend to retard the side-ways movement of the string when the bait is drawn through the water. The rear part 2 is formed to provide a vertical longitudinally extending fish tail 12.

When the bait is being drawn through the water, the tail end of the bait will be in a position as shown in Fig. 2 or Fig. 3. The bait will then swing out to the left or to the right. The string will tend to retard or prevent the swinging action and the pressure of the water against the tail fin 12 of the bait will overcome the action of the resilient member 4 and straighten out the angle between the part 1 and the part 2 until the spring will pass the point of highest tension and swing the tail part out to the other side. The artificial bait will then shift its swinging movement to the other side and the same thing will happen again at the next moment.

The frequency of the zigzag movement of the bait when pulled through the water will depend upon the speed with which it is being pulled through the water.

I claim:

1. In a fish lure of the wagtail type adapted to be drawn through the water, an elongated body member adapted to be connected at the forward end thereof to a fishline, a tail member pivotally connected to the body member at the rear end of the latter, and a spring member connected to said body member and to said tail member in such a manner as to span the pivotal connection therebetween, said spring member being adapted to bias the tail member to one side or the other of the longitudinal axis of the body member, said tail member having a vertical longitudinally extending tail fin adapted, when the fish lure is being drawn through the water, to counteract the biasing action of said spring member and to cooperate with the latter to cause the tail member to wigwag.

2. In a fish lure of the wagtail type adapted to be drawn through the water, an elongated body member adapted to be connected at the forward end thereof to a fishline, a tail member pivotally connected to the body member at the rear end of the latter, a spring member connected to said body member and to said tail member in such a manner as to span the pivotal connection therebetween, said spring member being adapted to bias the tail member to one side or the other of the longitudinal axis of the body member, said tail member having a vertical longitudinally extending tail fin adapted, when the fish lure is being drawn through the water, to counteract the biasing action of said spring member and to cooperate with the latter to cause the tail member to wigwag and adjustable stops carried by said tail member on either side of the latter and adapted to engage the body member for determining the maximum angular movement of the tail member about the pivotal connection.

3. In a fish lure of the wagtail type adapted to be drawn through the water, an elongated body member adapted to be connected at the forward end thereof to a fishline, a tail member pivotally connected to the body member at the rear end of the latter, an elevation rudder pivotally attached to the tail member and manually adjustable thereon for determining the depth to which lure shall swim during use, and a spring member connected to said body member and to said tail member in such a manner as to span the pivotal connection therebetween, said spring member being adapted to bias the tail member to one side or the other of the longitudinal axis of the body member, said tail member having a vertical longitudinally extending tail fin adapted, when the fish lure is being drawn through the water, to counteract the biasing action of said spring member and to cooperate with the latter to cause the tail member to wigwag.

4. In a fish lure of the wagtail type adapted to be drawn through the water, an elongated body member adapted to be connected at the forward end thereof to a fishline, a tail member pivotally connected to the body member at the rear end of the latter, an elevation rudder pivotally attached to the tail member and manually adjustable thereon for determining the depth to which lure shall swim during use, a spring member connected to said body member and to said tail member in such a manner as to span the pivotal connection therebetween, said spring member being adapted to bias the tail member to one side or the other of the longitudinal axis of the body member, said tail member having a vertical longitudinally extending tail fin adapted, when the fish lure is being drawn through the water, to counteract the biasing action of said spring member and to cooperate with the latter to cause the tail member to wigwag and adjustable stops carried by said tail member on either side of the latter and adapted to engage the body member for determining the maximum angular movement of the tail member about the pivotal connection.

JOHANNES GRAATEN.

REFERENCES CITED

The following references are of record in the file of this patent:

UNITED STATES PATENTS

| Number | Name | Date |
|---|---|---|
| 1,188,583 | Townsend | June 27, 1916 |
| 1,393,617 | Frame | Oct. 11, 1921 |
| 1,928,418 | Garland | Sept. 26, 1933 |
| 2,381,791 | Wadsworth et al. | Aug. 7, 1945 |

FOREIGN PATENTS

| Number | Country | Date |
|---|---|---|
| 97,069 | Sweden | Oct. 10, 1939 |
| 722,798 | France | Jan. 5, 1932 |